No. 685,435. Patented Oct. 29, 1901.
F. M. RUSCHHAUPT.
PROCESS OF DESULFURETING AND SETTLING RAW SALT BRINE.
(Application filed Apr. 26, 1901.)
(No Model.)
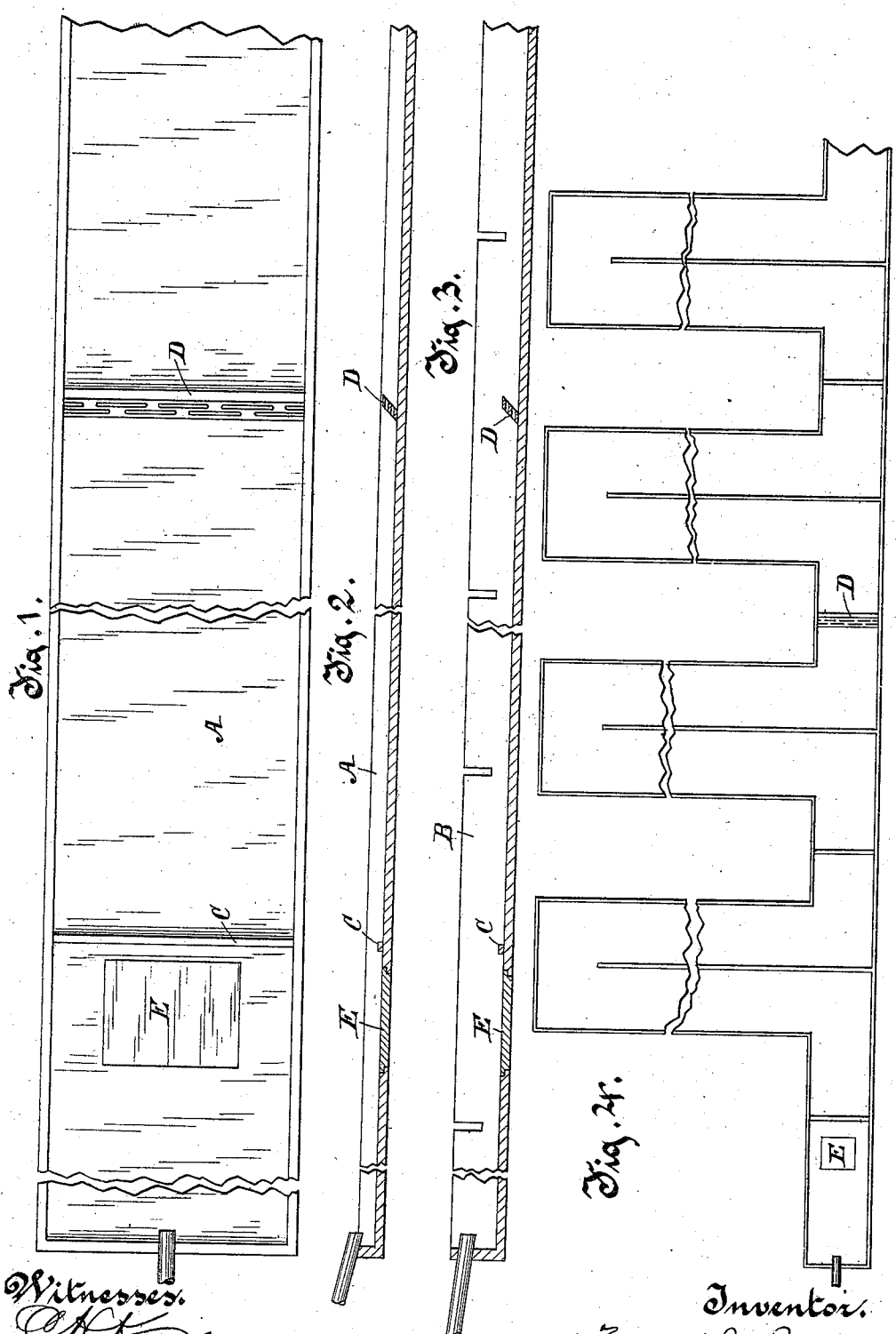

UNITED STATES PATENT OFFICE.

FREDERICK M. RUSCHHAUPT, OF MILWAUKEE, WISCONSIN.

PROCESS OF DESULFURETING AND SETTLING RAW SALT BRINE.

SPECIFICATION forming part of Letters Patent No. 685,435, dated October 29, 1901.

Application filed April 26, 1901. Serial No. 57,542. (No specimens.)

*To all whom it may concern:*

Be it known that I, FREDERICK M. RUSCHHAUPT, residing at Milwaukee, in the county of Milwaukee and State of Wisconsin, have invented a new and useful Process of Desulfureting and Settling Raw Salt Brine, of which the following is a description, reference being had to the accompanying drawings, which are a part of this specification.

It is known that sulfureted hydrogen gas, being remarkably soluble in or absorbed by water and solutions of substances, as salt, &c., in water, escapes again out of such solutions by exposing the same to the open air, or by driving a current of atmospheric air or gas through them, or liberating a gas in them, or, finally, by a sufficient increase of their temperature. It is also known that the perfect settling of a turbid solution, as raw salt brine, (for brine frequently comes from the brine-producing wells more or less muddy and strongly impregnated with such sulfureted gas,) is retarded from clarifying and settling quickly by the constant slow escape of said gas, which also otherwise hinders clarification, since it attacks the metals of the pipes, pans, and machinery, causing much discoloring of the salt by its black metallic precipitates. Therefore heat to bring the brine almost to the boiling-point is employed to effect the required desulfureting and settling of the brine; but as this is done in open pans or reservoirs it requires a considerable amount of fuel, especially as a very large amount of heat is lost in this tedious and expensive process.

My invention relates to the process of clarifying and settling turbid water or watery solutions by adding clarifying substances—such as alum, lime, &c—to the same, which, however, cannot act beneficially unless the turbid water or watery solutions contain certain substances with which they can form insoluble compounds adapted to take and hold therein all turbid matter and directly to perfectly precipitate with them to the bottom.

The objects of my invention are, first, to liberate from the raw salt brine all sulfureted hydrogen gas and to clarify and settle the same to clearness without employing any artificial heat; second, to afford facilities to do this in the shortest possible time, and, third, to accomplish all this most economically or without any considerable expense.

Suitable means for carrying out my improved process are simple in form and may be readily constructed.

In the accompanying drawings I illustrate means by which my process can be carried out, though I do not wish to limit my invention to or by the specific means I illustrate in the drawings.

In the drawings, Figure 1 is a plan view of a fragment of a shallow trough, parts being omitted for convenience of illustration, which may be employed for carrying out my process. Fig. 2 is a longitudinal section of the fragments of the trough shown in Fig. 1. Fig. 3 is a longitudinal section of a trough similar to the one illustrated in Figs. 1 and 2, except that the side walls of the trough are somewhat higher than the walls of the trough shown in Figs. 1 and 2, and these higher walls are notched or provided with transverse passages for the inflowing of air or the escape of gas therethrough. Fig. 4 is a top plan view of a fragment of a trough, parts being broken away for convenience of illustration, which also may be employed for the carrying out of my improved process, this particular form of trough being adapted for securing a long trough course by diverting the course laterally back and forth, and thus obviating the necessity for the long trough course in a continuously-straight line.

My improved process is accomplished by the transmission or flowing of the turbid brine in and through a long shallow trough—such, for instance, as is shown at A—with very low side walls to allow the free escape of the sulfureted gas, which, being heavier than atmospheric air, is apt to redissolve in the brine if it is allowed to remain in contact with it, as would be the case if the side walls were higher than just such as are required for the safe inclosure of the liquid. These troughs are preferably placed in the open air and supported by any suitable means at such inclination as to cause the slow but free movement of the brine by its natural current along and through the trough and high enough above the ground to permit of the escape of the gas, which is heavier than the air, over the edge of the side walls of the trough (or through the apertures through the walls, where they are made higher and are provided with apertures, as in the form shown in Fig. 2) and into the open air below, thus removing it from contact with the brine and preventing the reabsorption of the gas into the brine. These troughs advisably extend and discharge into the reservoirs or settlers adapted for receiving the thus-clarified brine. The construction and arrangement of the shallow troughs are advisably such that the brine as it comes from the well may be discharged directly into a trough and will run thence through the trough to the brine-receiving reservoirs or settlers. The length of each trough should be from five hundred to fifteen hundred feet, or even more, as conditions may suggest or require, and in this trough the brine preferably should not be more than one and one-half inches deep. The trough may be from one to four feet wide, according to the capacity of the supply of brine, thus exposing a large surface of the brine to the air. The troughs are best constructed and arranged in angular or diverse directions—as, for instance, as shown in Fig. 4—so that the line of flow of the brine is repeatedly changed, whereby the favorable action of sun and wind is always utilized to the utmost possible extent. These troughs are to be located in the open air and preferably without a roof over them; but a roof may be placed over them to protect the brine from heavy rain or showers; but it would be advisable to have such roof so arranged that it can be uptilted or removed, if possible, to secure the direct and more efficient rays of the sun on the brine when the sun shines. On this long run of the brine in such a shallow trough in the open air the brine will not only be liberated of all sulfureted-hydrogen gas, but also all impurities suspended therein and subject to precipitation will finally sink to the bottom, where they are securely retained by simple cleats or riffle-bars across the trough on its bottom surface, which cleats need not be over one inch in height. Such a bar is shown in the drawings at C. Also, if found desirable, higher cleats or perforated dams, such as shown at D, may be provided, through which the brine will run in jets, and will thereby be more extensively exposed to the air than if it ran along in unbroken current on the bottom of the trough. Also removable doors or traps of the character of the one shown at E may be provided in the bottom of the trough for discharging from the trough the sediment or precipitated matter that has been deposited on the bottom of the trough.

As has before been explained, the sulfureted gas that is driven off from the brine at its surface, being heavier than the air, would remain in contact with the surface of the brine and would ultimately be reabsorbed, to some extent at least, in the brine, if not permitted to escape from thus resting on the brine, and it is for this purpose that the troughs are provided with low side walls, as shown in Figs. 1, 2, and 4, which are only high enough (about two inches) to just hold the brine therein, and therefore are low enough to permit of the flow of the sulfureted gas over the side walls off from the surface of the brine. In Fig. 3 a form of trough is shown in which the side walls B are somewhat higher than are required to retain the brine therein, but are provided with lateral recesses or apertures through which the sulfureted gas may escape from the surface of the brine through the walls outwardly into the open air. These higher walls prevent the wind from blowing the brine over the edge of the walls, while providing for the entrance of the air in currents through the walls onto the surface of the brine and for the escape of the gas from the surface of the brine into the open air. Should it be the case that the thus-desulfureted brine is not entirely clarified or does not indicate any tendency to a ready settling, I may add a solution of properly-qualified substances to it, which by reaction upon each other will form a dense precipitate that will soon change into large flakes suitable to firmly inclose all remaining suspended light turbid matter and to sink with such flakes to the bottom. For such purpose and as cheapest therefor solutions of alum or aluminic sulfate (preferably the latter) and common soda, or, better, soda ash, act with the best success. About thirty pounds of aluminic sulfate (or the equivalent amount of alum) and sixty pounds of soda ash (or its equivalent of common soda) will be sufficient to perfectly clarify and settle one thousand barrels of moderately-turbid brine, which quantity of course has to be increased to about double the amount if the desulfureted brine should prove to be unusually turbid or loaded with light clayish matter, &c. The settling in all cases will be perfect and accomplished in from four to ten hours. The solutions are best to be added one after the other to insure the evolution of carbonic acid in the brine, and thereby not only the expelling of the last traces of sulfureted gas, but also the change of the formed dense milky precipitate of hydrate of aluminic oxid into the mentioned flakes, essential for perfect settling.

If there is a small excess of soda carbonate over the required amount necessary to take up the sulfuric acid of the aluminic sulfate, this will be beneficial, since it will decompose possible gypsum contained in the raw brine, forming insoluble lime carbonate, which being taken up by the aluminate flakes helps to increase their weight for quicker settling.

What I claim as my invention is—

The process of clarifying turbid brine, consisting of conveying the brine for a long distance in a shallow trough, the trough having side walls from which evolved sulfureted gas heavier than the air may readily escape by flowing laterally from the surface of the brine substantially at a level with the surface of the brine, and then adding to the brine an aluminic sulfate and soda substantially in the amounts and in the manner described.

In testimony whereof I affix my signature in presence of two witnesses.

FREDERICK M. RUSCHHAUPT.

Witnesses:
ANNA V. FAUST,
C. T. BENEDICT.